United States Patent [19]

Smith

[11] Patent Number: 5,676,708

[45] Date of Patent: Oct. 14, 1997

[54] NON-MUTAGENIC DYE

[75] Inventor: Michael J. Smith, Newtown, Pa.

[73] Assignee: United Color, Inc., Newtown, Pa.

[21] Appl. No.: 603,120

[22] Filed: Feb. 20, 1996

[51] Int. Cl.$^6$ .................................. C10L 1/22; D06P 1/18
[52] U.S. Cl. .................... 8/521; 8/527; 8/617; 8/687;
8/938; 44/328; 534/649; 534/832
[58] Field of Search .................... 8/514, 521, 524,
8/527, 617, 506, 687, 938; 44/328; 534/649,
832

[56]  References Cited

U.S. PATENT DOCUMENTS

| | | |
|---|---|---|
| 241,661 | 5/1881 | Holliday et al. . |
| 921,546 | 5/1909 | Julius et al. . |
| 1,947,028 | 2/1934 | Woodward . |
| 2,007,510 | 8/1935 | Thornton . |
| 2,016,495 | 10/1935 | Heyna et al. . |
| 2,090,938 | 8/1937 | Conrad . |
| 2,346,508 | 4/1944 | Richardson . |
| 2,538,431 | 1/1951 | Shulman . |
| 2,829,118 | 4/1958 | Wehr . |
| 2,850,493 | 9/1958 | Seruto . |
| 2,925,333 | 2/1960 | Thompson . |
| 2,989,358 | 6/1961 | Jurgeleit . |
| 3,004,821 | 10/1961 | Gano . |
| 3,009,760 | 11/1961 | Lenz . |
| 3,049,533 | 8/1962 | Spitzer et al. . |
| 3,073,664 | 1/1963 | Spitzer et al. . |
| 3,128,146 | 4/1964 | Bianco et al. . |
| 3,356,443 | 12/1967 | Dziomba . |
| 3,494,714 | 2/1970 | Litke . |
| 3,534,016 | 10/1970 | Lange . |
| 3,690,809 | 9/1972 | Orelup . |
| 3,704,106 | 11/1972 | Orelup . |
| 3,793,305 | 2/1974 | Balon . |
| 3,862,120 | 1/1975 | Orelup . |
| 4,000,985 | 1/1977 | Orelup . |
| 4,009,008 | 2/1977 | Orelup . |
| 4,042,579 | 8/1977 | Arsac et al. . |
| 4,049,393 | 9/1977 | Orelup . |
| 4,056,367 | 11/1977 | Arsac et al. . |
| 4,141,892 | 2/1979 | Renfrew et al. . |
| 4,315,756 | 2/1982 | Zeidler et al. . |
| 4,473,376 | 9/1984 | Hansen et al. . |

FOREIGN PATENT DOCUMENTS

| | | |
|---|---|---|
| 772062 | 11/1967 | Canada . |
| 0012297 | 6/1980 | European Pat. Off. . |
| 1551833 | 1/1968 | France . |
| 2509560 | 9/1975 | Germany . |
| 45-13474 | 5/1970 | Japan . |
| 6800692 | 4/1969 | Netherlands . |
| 527889 | 10/1972 | Switzerland . |
| 489562 | 7/1938 | United Kingdom . |
| 688000 | 2/1953 | United Kingdom . |
| 1180854 | 2/1970 | United Kingdom . |

OTHER PUBLICATIONS

Thorpe, J.F., et al., "Preparation of Dyestuffs," *The Synthetic Dyestuffs*, no month available, 1933, pp. 389–392.

FIAT Report 1313, vol. II, pp. 376–377.

Fierz–David, H.E., et al., *Fundamental Processes of Dye Chemistry*, no month available, 1949, pp. 270–271.

BIOS Report 1149, pp. 52–43.

Bradley, W., et al., "Benzene–soluble Aryldiazonium Salts," *Nature*, vol. 178, No. 4541, no month available, 1956, pp. 1069–1070.

Bradley, W., "The Mechanism of the Coupling Process," *The Journal of the Society of Dyers and Colourists*, vol. 75, No. 6, no month available, 1959, pp. 289–291.

Zollinger, H, "Color Chemistry: Syntheses, Properties and Applications of Organic Dyes and Pigments", *VCH*, no month available, 1987, pp. 95–96.

Groggins, P.H., ed., "Unit Processes in Organic Synthesis," *Chemical Engineering Series*, no month available, 1938, pp. 115–152.

Primary Examiner—Margaret Einsmann
Attorney, Agent, or Firm—Richard H. Kjeldgaard; Howrey & Simon

[57] ABSTRACT

A dye composition that presents lower mutagenic characteristics useful in coloring petroleum products comprising a substantial amount of the dye of the formula

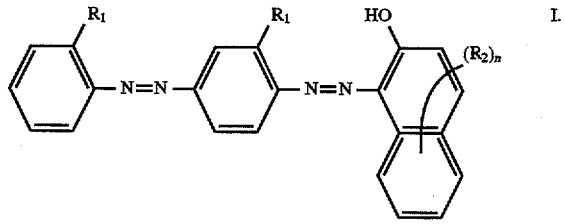

24 Claims, No Drawings

5,676,708

NON-MUTAGENIC DYE

BACKGROUND

Dyes have often been used to color petroleum products such as diesel fuel, gasoline, lubricating oils, grease, automatic transmission fluids and plastic products. Red is a particularly important petroleum dye color used in a variety of applications. Internal Revenue Service regulations, for instance, require the use of red dye to identify off-road diesel fuels. Red dye has also been used in automatic transmission fluids. There is concern, however, that some red dyes presently used in the industry, particularly amino-azo benzene derived red dyes, pose potential health risks because they may be mutagenic or carcinogenic. Moreover, the manufacture of these materials requires handling mutagenic, carcenogenic materials and intermediates. Handling these dyes or products containing the dyes, may involve some level of health risk because of the possible mutagenic character of the dye.

Red azo dyes for coloring petroleum products have been commercially available for many years. For example, U.S. Pat. Nos. 3,690,809 and 3,704,106 describe liquid dyes, some of which have been useful for coloring petroleum products, and, in some instances, plastics. Although these dyes may be effective colorants, the raw materials and intermediate products used in their production may present health risks if not handled properly. Some of the more widely used compounds, such as red C. I. Solvent Reds 24 and 164, are derived wholly or in part from 2-methylaniline, which is a suspected human carcinogen. In particular, to produce the foregoing red dyes, 2-methylaniline is converted, in whole or in part, to 1-amino 2,2' dimethyl-4-azobenzene, which is also known to be a carcinogen. The azobenzene compound, which is sometimes isolated, is then converted to a diazonium compound that is azo coupled to 2 naphthalenol, or an alkyl derivative thereof, to produce the red dye. The red dye is typically sold as a liquid concentrate, but may also be prepared and used as an unsolvated solid. In addition to potential health concerns associated with the final dye products and the precursor these conventional red azo dyes are somewhat unstable in that they can be degraded under conditions of excessive heat or by contact with a protogenic acid or chemical reducing agent. During degradation, for instance, Solvent Reds 24 and 164 produce 1-amino-2,2'-dimethyl-4-azobenzene and/or its homologues, which are also suspected to have carcinogenic activity.

Producing dyes and compositions which present lower carcinogenic risks is a desirable goal which can lower health risks for dye manufacturers and consumers. In accordance with the present invention, dyes and dye compositions are provided which yield a negative Ames Test result, indicating that the dyes are non-mutagenic. The starting materials, intermediates, and degradation products of the present invention, also present reduced mutagenic risks.

SUMMARY OF THE INVENTION

The present invention provides a composition comprising a dye component of the formula:

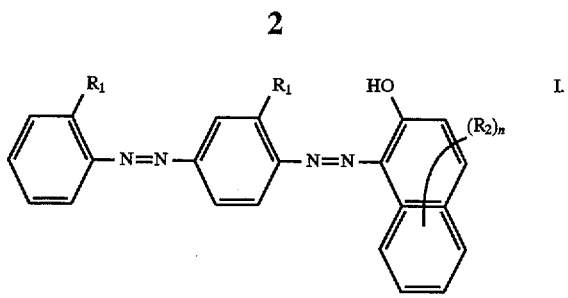

wherein $R_1$ is an ethyl or isopropyl group and $R_2$ is an alkyl group containing from 3 to 12 carbon atoms and n is a number from 1 to 3; and the dye component contains a substantial amount of Formula I; and a petroleum product.

The present invention additionally provides a composition comprising a dye component of the formula:

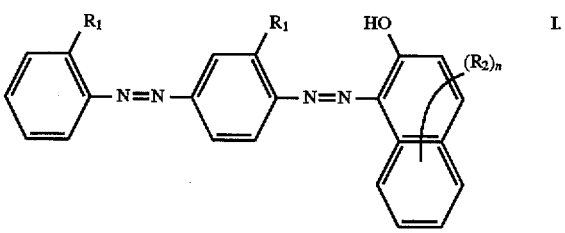

wherein $R_1$ is an ethyl or isopropyl group and $R_2$ is an alkyl group of from 3 to 12 carbon atoms and n is a number of 1, 2 or 3; and the dye component contains a substantial amount of Formula I; and a liquid carrier for said dye component selected from the group consisting of alkyl benzenes and naphthalenes.

The present invention also provides a composition comprising a dye component of the formula:

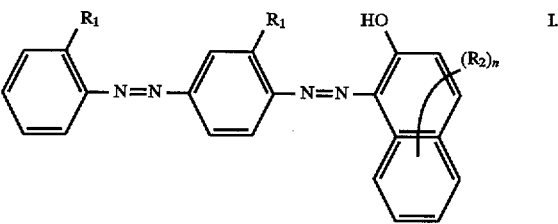

wherein $R_1$ is an ethyl or isopropyl group and $R_2$ is an alkyl group containing from 3 to 12 carbon atoms and n is a number from 1 to 3; and the dye component contains a substantial amount of Formula I; and a plastic product.

The present invention further provides a composition comprising a dye of the formula

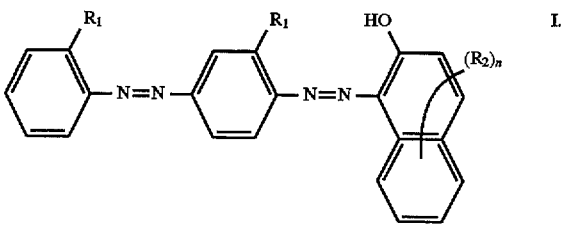

wherein $R_1$ is an ethyl or isopropyl group and $R_2$ is an alkyl group of from 3 to 12 carbon atoms and n is a number of 1, 2, or 3; and said dye composition contains a substantial amount of Formula I.

DETAILED DESCRIPTION OF INVENTION

The present invention provides compositions containing dye which is substantially non-mutagenic. Applicants have found that by restricting the location and structure of the substituents in the following bisazo dye compound as illustrated, a dye is provided that does not test positively in the "Ames Test" conducted according to current generally accepted protocols. The dye of the present invention is represented by the following formula:

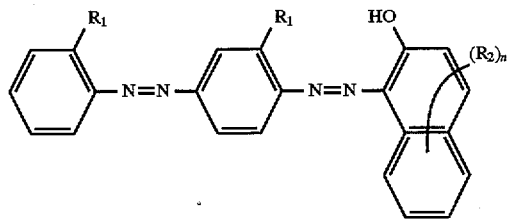

wherein $R_1$ is an ethyl or isopropyl group and $R_2$ is an alkyl group containing from 3 to 12 carbon atoms and n is a number from 1 to 3; and the dye component contains a substantial amount of Formula I.

When the foregoing dye of Formula I makes up a substantial amount of a dye component of the present invention, the resulting composition has substantially no mutagenic risk attributable to the dye. A dye component of the present invention will contain or be comprised of a substantial amount of the dye of Formula I when chemicals conforming to Formula I are the primary or main colorant. Moreover, the dye component will preferably contain an amount of Formula I sufficient to provide a negative Ames Test result. Generally, that is expected to occur when about 50% of the dye component and more preferably about 85% to about 100% of the dye component is Formula I. There may however, be some dye materials in the dye component than do not conform precisely to Formula I. The reactions used to make Formula I may not always go to completion or may yield small quantities of byproducts that fall outside of Formula I. It is understood that such other material may be present in the dye component without departing from the present invention. For instance, there may be some dye molecules that lack any alkyl group on the naphthol ring moiety of Formula I. The presence of such material in the dye component do not prevent a dye component from falling within the scope of the present invention as long as a substantial amount of the dye component does conform to Formula I.

Preferably, the color component of composition of the present invention will be all or substantially all chemicals of Formula I. The percentage of the dye component that is comprised of Formula I, however, may deviate below 100%, but typically needs to remain above 50% to ensure a negative Ames test.

The dyes of this invention can be made in either liquid or solid (tar or dry powder) forms. Due to the desire of commercial users for convenient and easy handling, concentrated liquids are usually preferred, particularly in the United States. When a liquid concentrate is used, the dye component will typically comprise about 25% of the liquid concentrate. Other degrees of dilution, however, may be used. The remainder of a liquid concentration of the dye will be solvents such as alkyl benzenes, xyledenes, naphthalenes or other hydrocarbons, esters, ketones, etc., appropriate to the final intended use.

The dyes of the present invention can be made by any of the several synthetic techniques familiar to those of ordinary skill in the art. Typically, to form a petroleum soluble liquid concentrate containing applicants' dye, three main steps are involved: 1) preparation of a "red base" by coupling aromatic amines to give an amino-azo compound; 2) preparing an alkyl beta-naphthol; and 3); coupling the diazotized red base with the alkyl beta naphthol to form the red azo dye.

Methods of making dyes of the present invention are contained in U.S. Pat. Nos. 3,690,809 and 3,704,106 the disclosures of which are incorporated herein by reference in their entirety. Many different processes may be used, however, depending on capabilities of available manufacturing facilities.

In the formation of red base useful to make compounds of Formula I, the diazotization of 2,2' diethyl or 2,2' di (1-methylethyl) aminoazobenzene, or combinations thereof, is involved followed by their azo coupling with alkyl substituted 2-naphthalenol. The aminoazobenzene derivatives may be synthesized, for instance, by the methods disclosed U.S. Pat. No. 2,538,431, or FIAT Report 1313 Volume II, page 376, the disclosures of which are incorporated herein by reference in their entirety. Other aspects of preparing a red base are disclosed in Zollinger, "Color Chemistry" (1987); U.S. Pat. No. 4,000,985; Groggins, "Unit Processes In Organic Synthesis," (1938); and U.S. Pat. No. 3,793,305, the disclosures of which are incorporated herein by reference in their entirety.

The alkylnaphthalenols may be synthesized by the classic Friedel-Crafts alkylation reaction for instance in accordance with those methods suggested in U.S. Pat. No. 2,090,938, and British Patent 688,000, and U.S. application Ser. No. 468,551 (filed Jun. 6, 1965) the disclosures of which is also incorporated herein by reference in their entirety. In general, a crude alkyl beta-naphthol intermediary may be prepared by alkylating beta-naphthol by condensation with alkenes in the presence of a catalyst such as zinc chloride, boron trifluoride, or an appropriate ion exchange resin, optionally together with an acid such as hydrochloric acid or hydrobromic acid. Alkenes, used to alkylate the naphthol moeity include properie, heptene, octene and nonene which are commercially available and usually consist of a mixture of isomers. Alternatively, the alkylnaphthol may be prepared by the condensation of an alcohol with the naphthol in the presence of a Friedel-Crafts catalyst.

The red base and alkyl beta naphthol are coupled together by techniques that are mentioned or disclosed in the above-identified references. They may be coupled in the presence of base or in the presence of acid (sometimes referred to as reverse coupling). Reverse coupling is illustrated, for instance, in U.S. Pat. Nos. 921,546, 1,947,029 and 2,016, 495, the disclosures of which are incorporated herein by reference in their entirety. In general, if a liquid, petroleum-soluble dye composition is desired, the coupling may be carried out in the presence of the desired solvent, such as xylene.

In the process of the present invention, the reagent 2-methylaniline, used in making the conventional red dye for gasoline and diesel fuel is replaced by adding either 2-ethylaniline or 2-(1 methylethyl)aniline. Particularly when the starting material consists, essentially of these materials and in free of methyl-aniline, the process produces substantially an azobenzene (1 amino 2,2' diethyl 4 azobenzene or 1-amino-2,2'-di-isopropyl-4-azobenzene, respectively) that has no mutagenic activity detected by the Ames Test. This is a improvement over the prior processes that use raw materials such as 2-methylaniline and other methyl-substituted anilines because 2-methylaniline is a suspect carcinogen and even though other methyl-substituted anilines are not carcinogenic themselves the dyes they produce generate a positive Ames Test. By eliminating use of 2-methylaniline, one carcinogenic hazard associated with the production of red dye is thus eliminated.

The method of this invention is also distinct from prior methods in that the composition of the alkylated 2-naphthalenol, and alkyl derivatives thereof, contains no more than about 15% by weight and preferably less than about 10% free unalkylated 2-naphthalenol. This produces a dye wherein at least one of the hydrogen atoms in the naphthalene nucleus is substituted by an alkyl group. This is important since the unalkylated 2-naphthalenol and derived homologues are weakly mutagenic. The examples below demonstrate that a small amount of this homologue can be tolerated in the final alkyl-naphthalenol dye without triggering a mutagenic response. Reducing the presence of this homologue as much as possible, however, is desirable to further reduce mutagenic risk attributable to the dye.

The mutagenic characteristics of chemicals, including the red dyes discussed above, are evaluated using a current conventional and recognized test known as the "Ames Test". The test is generally described in L. J. Watkins, et al. "Molecular Biology of the Gene," 4th Ed., Vol. I, (1987) p. 355–357; and Ames, B. 1979 "Identifying Environmental Chemicals Causing Mutations and Cancer." Science 204: 587–593, the disclosures of which are incorporated herein by reference in their entirety. A positive Ames Test result indicates that a compound is mutagenic. A positive Ames Test therefor also indicates that the tested compound possibly possesses carcinogenic activity. Thus, the carcinogenic potential of a compound may be predicted based upon the Ames Test results.

In general, the Ames Test is a *S. typhimurium* reversion assay. Select histidine auxotrphs of *S. typhimurium* have been selected which are normally growth-arrested due to mutations in a gene needed to produce an essential amino acid: histidine. In the absence of an external histidine source, the cells cannot grow to form colonies unless a reversion of the mutation occurs which allows the production of histidine to be resumed. As might be expected spontaneous reversion occurs with each of the strains, usually at a low level (with the exception of a strain known as TA 100). However, chemical agents can induce a mutagenic response so that the number of revertant colonies is substantially higher than the spontaneous background reversion level. The test involves analysis of the number of revertent colonies obtained with each strain in the presence and absence of the test chemical. Since the mutagenic response of a formulation could vary with the concentration, test materials are routinely dosed over an appropriate concentration range. In a standardized protocol, a complete matrix of positive and negative controls are included with the assay, and are plated in duplicate with all of the test strains. Aroclor™ 1254 induced rat liver microsomes are included to mimic the in vivo activity of the liver enzymes in activating some pro-mutagens to mutagenic status. The protocols for performing an Ames Test are well established and are performed by a number of testing organizations such as Litron Laboratories in Rochester, N.Y.

The criteria for determining whether a sample is mutagenic is generally as follows:

1. For a negative Ames Test (not mutagenic), total revertants in any strain at any concentration should not be at or greater than three times background, with or without metabolic activation.

2. For a positive Ames test (mutagenic), two or more consecutive points must be at or greater than two times background in the same strain either with or without metabolic activation. A clear indication of mutagenicity is obtained when the sample exceeds three times background at any concentration.

3. When the background is running low (e.g. 6 colonies or less) and a good response is obtained with the positive control, then the number of revertants should exceed twenty colonies/plate for the sample to be scored as mutagenic.

The Examples and discussion below indicate that known red dyes have tested positive for mutagenic activity and the dyes of the present invention tested negative. When subjected to the Ames Test, 1 amino-2-2'-dimethyl-4-azobenzene demonstrated significant mutagenic activity. Although the mutagenic activity of the red dye itself is much less than that of its precursor amine, it too gives a positive result using the Ames Test. Surprisingly, dyes having very similar structures to the commercially used dyes gave drastically different mutagenic activities. In fact, before the present invention, it was not known how to produce non-mutagenic dyes that gave workers greater protection from the hazards of the carcinogens present in the dyes, their degradation products, and the raw materials and intermediates utilized during the production of these dyes. The product of the present invention, and its degradation products, do not produce positive mutagenic responses using the Ames Test and therefore represent a considerably lowered health risk to those who are exposed to them in the workplace.

The following examples serve to illustrate, but do not limit, the scope of the invention.

EXAMPLE 1

22.5 grams of 2,2'-dimethylamino-azobenzene is slurried with 200 mls of water at 45° C. 30 grams of hydrochloric acid 32% is then dripped into the well-stirred slurry of the amine base which, after a short period of time, is converted to a red dispersion of its hydrochloride. Ice is added to the system to cool it to 0° C. A solution of 7.5 grams sodium nitrite dissolved in 15 mls of water is now added rapidly and the temperature allowed to rise to 10°–15° C. After a short period of stirring a deep brown solution of the corresponding diazonium chloride is obtained. Excess nitrite is then removed by the addition of sulfamic acid.

Meanwhile about 0.105 moles of X-Heptyl-2-naphthol is dissolved in 100 mls toluene and 15 grams of sodium carbonate is added. The mixture is stirred well while the aqueous diazonium solution is run in. Azo coupling is instantaneous with the formation of a deep red dye solution and the evolution of carbon dioxide gas. The coupling is then heated to 60° C. and allowed to separate. The lower aqueous phase is discarded. The toluene solution of the dye is then heated to 140° C. under full vacuum to remove all materials volatile under these conditions. The liquid dye is cooled to 70° and 100 mls of methanol are added cautiously. The mixture is brought to reflux then allowed to cool, and the upper methanol layer decanted and the dye rinsed with clean methanol. This is repeated twice, after which final traces of methanol are removed by vacuum distillation. By means of these extractions any unreacted intermediates and subsidiary organic compounds are removed from the dye, which forms a brittle supercooled liquid at ambient temperatures. A sample of the dye is evaluated for mutagenic response in an "Ames Test" according to protocol (A11.95), with and without metabolic activation, employing strains of Salmonella typhimurium. Even at a minimal level of 50 micrograms per test plate of dye a strong positive mutagenic response is observed, which response is also observed at all other concentrations tested up to 5000 micrograms per plate.

EXAMPLE 2

The procedures of Example 1 are repeated except that the 22.5 grams 2,2' dimethylaminoazobenzene was replaced by 25.3 grams of 2,2' diethylaminoazobenzene. The final dye, when evaluated by the same Ames Test procedure identified in Example 1 shows no positive mutagenic response, even at the 5,000 micrograms per plate concentration.

EXAMPLE 3

The procedures of Example 2 are repeated except that the 0.105 equivalent of x-Heptyl-2-naphthol is replaced by a corresponding equivalent of x-Nonyl-2-naphthol. When subjected to the same Ames test procedure the dye also failed to show any positive mutagenic response.

EXAMPLE 4

25.3 grams of 22' diethylaminoazobenzene is diazotized by the procedure of Example 1 and the diazo run into a solution of 15 grams of 2-naphthol dissolved in 200 ml water with 5 grams of sodium hydroxide and 15 grams of sodium carbonate. Azo coupling proceeds instantaneously and the product separates as a dark red solid. This is filtered and washed free from alkali with cold water. The filter cake is then extracted twice with hot methanol, filtered, and dried to constant weight at 75° C. The final product shows a moderately strong positive mutagenic response when evaluated by the same Ames Test procedure.

EXAMPLE 5

The procedure of Example 4 is repeated except that the 15 grams of 2-naphthol coupling component are replaced by an equivalent amount of x-tertiary butyl 2 naphthol. The final product evaluated by the same Ames test procedure used for the previous examples showed no positive mutagenic response through concentration ranges of Example 2.

EXAMPLE 6

0.1 moles of 2,2' di (1-methylethyl) aminoazobenzene are diazotized by the procedure of Example 1 and azo coupled similarly with x-Heptyl-2-naphthol. The final product is negative in the Ames test.

EXAMPLE 7

0.1 molar equivalent of a mixed aminoazobenzene derived from equimolar amounts of 2-ethyl-aniline and 3-methyl-aniline an amine which is not usually reckoned to be mutagenic in its own right. This mixture is converted to red dye by the procedure of Example 1. The final product exhibits a definite positive response in the Ames test, although the response is weaker than the compound of Example 1.

EXAMPLE 8

The procedure of Example 7 is followed except that the mixed aminoazo body is derived from an equimolar mixture of 2 ethylaniline and 2(1 methylethyl) aniline. The final red dye shows no positive mutagenic response in the Ames test.

EXAMPLE 9

A sample of the compound of Example 2 is prepared in #2 fuel oil (home heating oil) at a concentration tinctorially equivalent to 25 milligrams Liter$^{-1}$ to the dyestuff CI Solvent Red 164, which is substantially composed of the compound of Example 1. The oils were tinctorially indistinguishable when tested according to procedures consequent upon Final Regulation TD-8550 concerning tax-exempt diesel fuels published by the United States Internal Revenue Service, Jun. 30, 1994, except that the dye of Example 2 is non-mutagenic while CI Solvent Red 164 is a positive mutagen according to Ames tests performed on the color-containing fuel oil.

What is claimed is:

1. A composition comprising a dye component which comprise a substantial amount of the dye of the formula

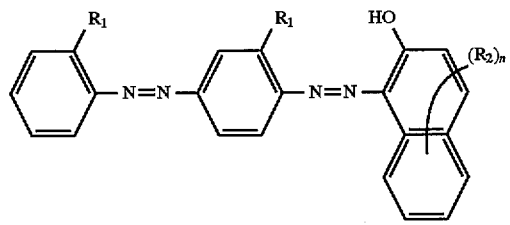

wherein $R_1$ is an ethyl or isopropyl group and $R_2$ is an alkyl group of from 3 to 12 carbon atoms and n is a number from 1, 2 or 3; and a petroleum product.

2. A composition of claim 1 wherein said dye component comprises about 85% or more of Formula I.

3. A composition of claim 1 wherein the petroleum product is a viscosity modifier.

4. A composition of claim 3 wherein $R_1$ is an ethyl group.

5. A composition of claim 4 wherein $R_1$ is an isopropyl group.

6. A composition of claim 2 wherein about 80% of $R_2$ is $C_4$–$C_9$.

7. A composition of claim 3 wherein $R_2$ is selected from the group consisting of butyl, heptyl, octyl or nonyl alkyl groups.

8. A composition of claim 1 wherein the petroleum product is selected from the group consisting of diesel fuel, gasoline, and heavy petroleum napthalene compounds.

9. A composition comprising a dye component which comprises a substantial amount of the dye of the formula

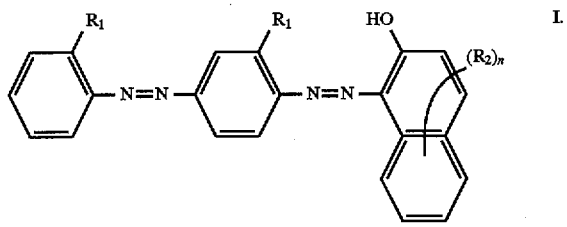

wherein $R_1$ is an ethyl or isopropyl group and $R_2$ is an alkyl group of from 3 to 12 carbon atoms and n is a number of 1, 2 or 3; and a liquid carrier for said dye component selected from the group consisting of alkyl benzenes and naphthalenes.

10. A composition comprising a dye component of the formula:

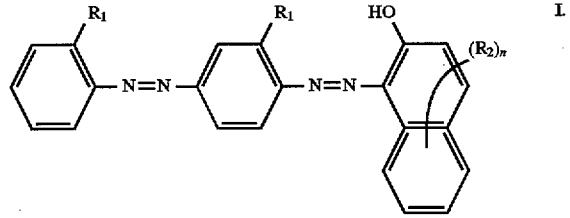

wherein $R_1$ is an ethyl or isopropyl group and $R_2$ is an alkyl group of from 3 to 12 carbon atoms and n is the number 1, 2 or 3; and the dye component contains a substantial amount of Formula I; and a plastic product.

11. A composition of claim 10 wherein about 85% or more of said dye component is Formula I.

12. A composition of claim 11 wherein the dye component is non-mutagenic.

13. A composition of claim 12 wherein $R_1$ is an ethyl group.

14. A composition of claim 12 wherein $R_1$ is an isopropyl group.

15. A composition of claim 11 wherein $R_2$ is $C_4$–$C_{12}$.

16. A composition of claim 11 wherein $R_2$ is tertiary butyl.

17. A composition of claim 13 wherein $R_2$ is tertiary butyl.

18. A composition of claim 14 wherein $R_2$ is tertiary butyl.

19. A composition of claim 11 wherein the plastics product comprises low melting polymers.

20. A composition of claim 19 wherein the plastics product comprises polystyrene.

21. A composition comprising a dye of the formula

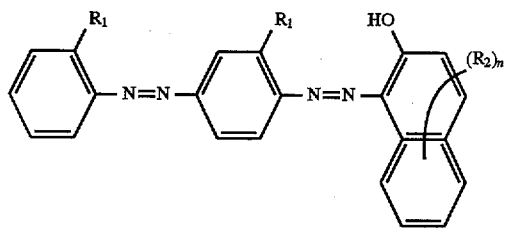

I.

wherein $R_1$ is an ethyl or isopropyl group and $R_2$ is an alkyl group of from 3 to 12 carbon atoms and n is a number of 1, 2, or 3; and said dye composition contains a substantial amount of Formula I.

22. A composition of claim 21 wherein said dye composition comprises about 85% to about 100% of Formula I.

23. A composition of claim 22 in solid form.

24. A composition of claim 22 in liquid form.

* * * * *